Feb. 27, 1968  S. A. GUERRIERI  3,370,361
GRID FOR FLUIDIZED SOLID VESSELS
Filed April 27, 1965

INVENTOR
Salvatore A. Guerrieri
BY *Flynn, Marn*
*& Jangarathis*
ATTORNEYS

United States Patent Office 3,370,361
Patented Feb. 27, 1968

3,370,361
GRID FOR FLUIDIZED SOLID VESSELS
Salvatore A. Guerrieri, Rowayton, Conn., assignor to The Lummus Company, New York, N.Y., a corporation of Delaware
Filed Apr. 27, 1965, Ser. No. 451,297
8 Claims. (Cl. 34—57)

ABSTRACT OF THE DISCLOSURE

This invention relates to a novel distributing grid for use in distributing one or more vapor streams to achieve effective fluidizing contact with a bed of particles. The grid of the present invention includes an upper cylinder portion having an outwardly extended flange, and a lower generally conical perforated portion, the upper cylindrical portion being smaller than the inside dimension of the reactor body in which the grid is mounted so that the grid is spaced inwardly therefrom.

---

In many industrial processes, it is desirable to contact solid particles with a fluid stream in a manner known as "fluidizing" the bed of particles. The particles are contacted by passing the gaseous fluid up through a bed thereof, so that the bed of particles expands and the particles are out of continuous contact with each other and in a state of relatively high mobility and density, thereby achieving good interfacial contact and uniform bed temperatures. An expanded bed of fluidized particles resembles a boiling liquid, with respect to appearance as well as hydrostatic and hydrodynamic properties, and has a mobile but distinct upper surface with small pockets of gas emitting therefrom. Fluidized beds promote good contact between gases and solids, reduce channelling problems, bring about effective utilization of all particles and cause extremely even utilization of heat and materials. An example of one use of a fluidized bed of particles is in the catalytic cracking of petroleum wherein a vapor phase petroleum fraction is contacted with a fluidized bed of heterogeneous silica-alumina catalyst particles. Another example of the use of fluidized beds is in the carbonization and gasification of shale oil fines. In the former instance the fluid medium is the reactant and the solid serves only as a catalyst but in the latter instance, the solid is itself a first reactant and the fluidizing medium, steam and air, is a second.

To obtain proper fluidization of the solid particles, it is necessary to distribute the fluid evenly through the lower portion of the bed so that no large bubbles of fluid pass through the bed, and so that no portion of the bed offers more resistance to fluid flow than any other portion of the bed. It is also necessary to construct a distributor or grid which has sufficient structural strength to support the entire bed of solid in the unfluidized condition in case of shutdown, an upset or accidental loss of gas pressure which causes the fluidized bed to collapse.

In order to increase structural strength, use of a distribution grid which is dome shaped has been suggested, since flat grids tend to bend or buckle under the weight of the bed in the unfluidized condition. The dome-shaped grid, however, is higher in the center than at the edges, so that less head of fluidized bed is above the central portion of the grid which, therefore, causes less resistance to flow at that point. As a result, a greater portion of the fluid flows to the center of the bed than to the periphery, and proper fluidization of particles is not obtained.

In many applications a flat grid cannot be supported around its edges by the vessel walls, since the metal-to-metal contact of the grid with the vessel wall causes heat conduction through the grid to the wall, with the result that a weakened hot spot on the vessel wall is created. The hot grid and cold metal wall also cause strains due to differential expansion that tend to buckle either the grid or the vessel. The distribution grid within the vessel must, therefore, be "floating" so that it may expand and contract without straining the vessel wall and so that it does not conduct heat through the insulation to the vessel wall. Of course, these limitations apply equally to flat or shaped distribution grids, in that any contact with the vessel walls provides a heat sink which will conceivably have adverse effects.

In order to obtain satisfactory distribution of the fluid stream, it is necessary that there be a substantial pressure drop in the stream as it passes through the grid. If this is done, each perforation in the grid will pass the same amount of fluid per unit area; in this regard it is advantageous to pass the fluid into a single chamber directly below the grid and introduce it therefrom through the perforations and thence into the fluidized bed. Of course, such a chamber, in which a higher pressure is maintained, tends to push the distribution grid upwardly, and a large flat plate, forming the top closure of the chamber, will tend to buckle outward. Thus, it may be seen that distribution grids in fluidized bed assemblies are subject to stresses and strains in both directions; they tend to buckle downward under shutdown conditions when the bed collapses onto the grid, and they tend to buckle upward, into the chamber, if gas pressure below the grid becomes too great.

In addition to the upward and downward forces which the distributing plate must sustain, provision must also be made for the thermal expansion and contraction of the distributing plate, inasmuch as it is subjected to much higher thermal cycling than the reactor shell.

It is therefore a general object of the present invention to provide an improved distribution head for use in a fluidized bed reactor which is simple and economical to construct, which provides an improved fluidizing action within the bed, and which readily sustains the various thermal and mechanical forces to which such distribution heads are subjected.

Various other objects and advantages of the invention will become clear from the following description of an embodiment thereof, and the novel features will be particularly pointed out in connection with the appended claims. Understanding of the invention will be facilitated by referring to the accompanying drawings, in which:

Figure 1:
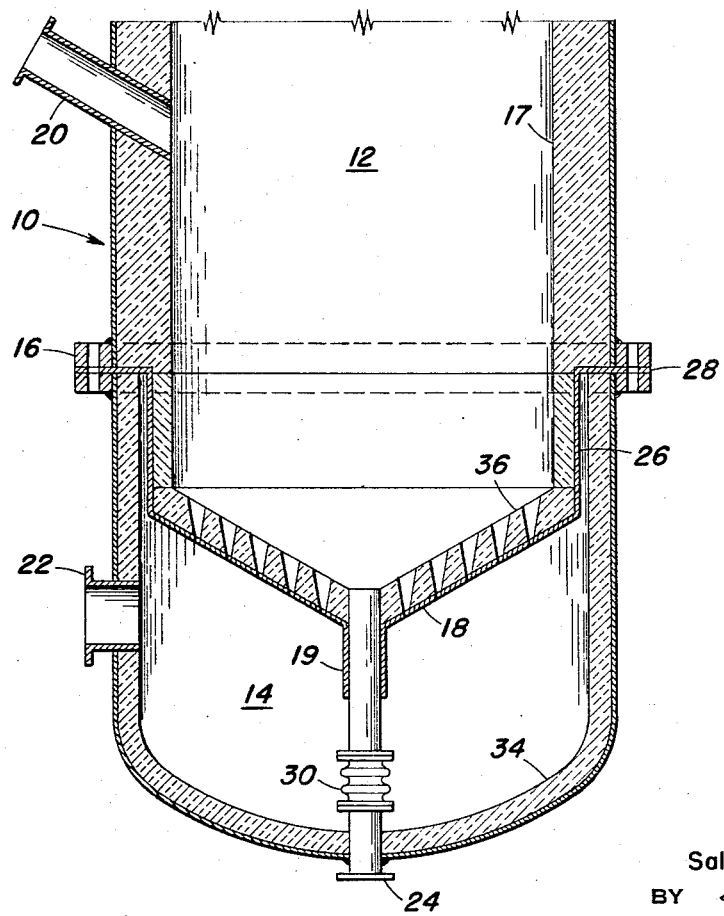
FIG. 1 is a partial, cross sectional elevation of a fluidized bed reactor according to the invention.

With reference to FIG. 1, the fluidized bed reactor, indicated generally at 10, is composed of an upper main body portion 12 and a lower portion 14, the two portions being joined together at 16. Depending on the particular end use, insulation 17 may or may not be needed. The distribution head according to the invention is illustrated at 18 and is seen to be of a general conical shape. The reactor is also equipped with an inlet for solids 20 in the upper portion, a gas inlet 22 below the distribution head, and a solids outlet 24 communicating directly with the upper section 12 of the reactor. A close-fitting sleeve 19 may be provided for securing outlet 24 to head 18. Outlet 24 may, in some applications, be located in the shell of upper section 12. The location shown in FIGURE 1 is advantageous for the continuous withdrawal of enlarged or heavier solid particles that settle in the bottom of the bed. Outlet 24 may, of course, be used to withdraw normal particles as well as lumps, or, alternatively, it may be used to withdraw lumps only while normal particles are withdrawn through an outlet (not shown) located in the shell of upper section 12.

As can be seen from FIG. 1, distribution head 18 is supported by a cylindrical section 26 which is of a slightly smaller diameter than the inside diameter of the reactor shell 14. The cylindrical portion 26 is connected at its upper extremity with annular plate 28 which is secured between the upper and lower sections of the reactor. It will be understood that this is an optional arrangement and other arrangements for fastening the distribution head within the reactor may be employed. It is only important that the vertical, cylindrical portion 26 be spaced from the inner wall of the reactor so as to allow for thermal expansion and contraction of the conical portion 18. An expansion joint 30 is provided in outlet 24 so that the conical portion 18 is "floating" in all of its connections to the reactor shell. For operation at elevated temperatures, heat flow to the metal shell is minimized by the use of refractory insulation 36 on the hot side of the distribution head and by the flow of cool gas on the underside.

By virtue of the generally conical shape of gas distribution head 18, there is provided a very substantial resistance to any upward forces caused by the gas pressure in lower section 14. Of even greater importance, distribution head 18 is designed so that the slope is greater than the angle of natural repose of the particles, and this prevents particles from building up or agglomerating thereon, which would interfere with proper gas flow and gas-solid contact. As is well known, for beds more than a few feet deep the downward force of a settled bed can be substantial, and the design of distribution head 18 successfully withstands such pressures.

As is normal in fluidized beds designed for operation at elevated temperatures, refractory lining materials 17, 34 are provided in the reactor shell itself as noted above, and additional refractory 36 is provided on the distribution plate to minimize heat flow to the metal parts.

Figure 2:
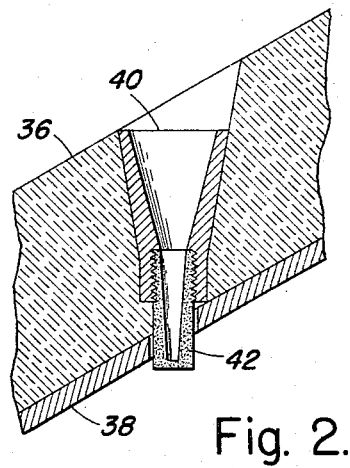
FIG. 2 is a detailed cross sectional view of one of the openings in the distribution head of the invention.

The particular design of the apertures within the plate 18 is illustrated in FIGURE 2. With reference to this drawing, plate 18 is seen to be comprised of a conical steel plate 38 and the aforementioned refractory material 36. Within the refractory material there is disposed an annular insert 40 having a substantially larger diameter at the upper end than at the lower end. This insert extends essentially through the refractory material but not through the steel plate 38. An insert 42 of a porous material is provided, which is adapted to pass through the aperture in plate 38 and screw into or otherwise join with the insert 40. As can be seen from FIG. 2, this insert or plug is closed at its lower end, but being porous provides little resistance to the upward flow of gas therethrough. In the event of gas failure, however, this plug will sustain the solid material within the reactor and prevent the same from passing through plate 18 and into the lower portion of the reactor. Of course, the embodiment illustrated in FIGURE 2 is not a necessary feature of the invention; perforations in the plate 38 and refractory 36 are really all that is required (see FIGURE 1).

Figure 3:
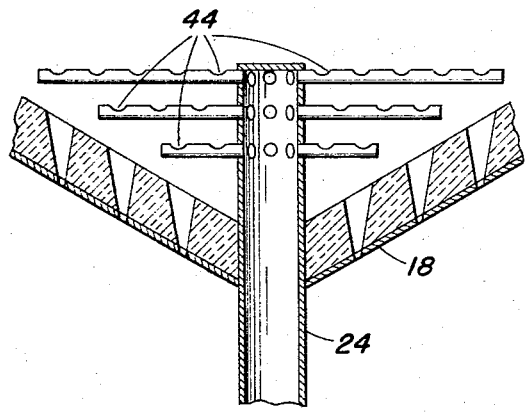
FIG. 3 is a partial cross sectional view of an alternative embodiment of the invention.

An alternative embodiment of the invention, useful where two separate reactant gases must be introduced into the fluidized bed, is illustrated in FIGURE 3. In this embodiment, conduit 24 is utilized as a second gas inlet rather than as a solids outlet. As shown in the drawing, conduit 24 extends through distribution head 18 and well into upper section 12. It is capped at the top, and is provided with a plurality of radially extending arms 44, each of which is perforated. Gas flowing through conduit 24 is thus evenly injected into the bed; mixing with the gas passing through distribution head 18 is excellent, as those skilled in the art will realize. The embodiment of FIGURE 3 is useful, for example, where two reactant gases are passed through a fluidized bed of catalyst particles.

Gas distribution heads for use in fluidized bed reactors employed heretofore have most commonly presented a flat surface to the fluidizing portion of the reactor (except for the dome-shaped types noted hereinabove), it being felt that this was necessary in order that a constant head be maintained above all portions of the distribution plate, thus insuring uniform fluidizing action and a proper upper, "boiling" surface free from large bubbles and the like. One of the surprising aspects of the generally conical design of the distribution head of the present invention is its effect on the fluidized bed.

For good gas distribution within the bed the pressure drop through the holes in distribution head 18 must be high enough so that the difference in head due to bed height over various points of the cone is small relative to the pressure drop through the holes. This effect requires very high gas velocity through the holes, which would in many instances be sufficient to cause attrition of solid particles. This is avoided, however, by the holes with an expanding cross-section in the refractory. This reduces the jet velocity and particle attrition is minimized.

It will be understood that various changes in the steps, details, materials and arrangements of parts, which have been hereinabove described and illustrated in order to explain the nature of the invention, may be made by those skilled in the art within the principle and scope of the invention as defined in the appended claims.

What is claimed is:

1. In a fluidized bed reactor comprising a reactor vessel, fluid inlet means and outlet means, the improvements comprising:
   a generally conical, perforated distributing grid having a lowermost central portion and a raised peripheral portion, said grid being above said fluid inlet means and below said solid inlet means;
   a cylindrical supporting portion secured in vapor tight connection at one end to said grid around the periphery thereof;
   securing means at the other end of said supporting portion adapted to retain said supporting portion and grid in spaced relation to the walls of said reactor vessel and in vapor tight connection between the portion of said vessel above and below said grid; and
   second fluid inlet means below said grid, an aperture in the lowermost central portion of said grid, conduit means in communication with said second fluid inlet means and passing through said aperture, and a plurality of radial gas-distributing conduits in fluid communication with said conduit and extending therefrom over said grid.

2. Fluid distributing means for a fluidized bed reactor for contacting fluids and a bed of solid particles, comprising:
   a generally conical, perforated distributing grid having a low central portion and a raised peripheral portion;
   a conduit passing through an aperture in the vertex of said distributing grid and having a plurality of radial fluid distributing conduits in fluid communication with said conduit and extending therefrom over said grid.

3. The fluid distributing means as claimed in claim 2 wherein said perforated distributing grid is for passing a first fluid into the bed of solid particles and said conduit is for passing a second fluid into the bed of solid particles.

4. In a fluidized bed reactor having an upper main body portion and a lower main body portion, the improvement comprising:
   a fluid distributing grid including;
   an upper cylindrical portion with an annular flange extending outwardly therefrom; and
   a lower, generally conical, perforated portion;
   said flange for positioning between said upper main body portion and said lower main body portion to support the upper cylindrical portion and lower perforated portion of said distributing grid in lateral and vertical spaced relation to said lower main body portion.

5. The apparatus as claimed in claim 4 wherein said fluid distributing grid is a single element.

6. The apparatus as claimed in claim 4 wherein said lower main body portion is cylindrical and said upper cylindrical portion of said distributing grid is smaller in diameter than the inside diameter of said lower main body portion.

7. The apparatus as claimed in claim 4 and further including:
   an aperture in the vertex of said conical perforated portion of said distributing grid;
   and a conduit in vapor tight engagement with said aperture for allowing escape of solid bed material from said fluidized bed.

8. The apparatus as claimed in claim 4 and further including:
   an aperture in the vertex of said conical perforated portion of said distributing grid; and
   a conduit in vapor tight engagement with said aperture, said conduit extending through and above said aperture, said conduit for the introduction of a fluid to the bed material of the bed reactor.

References Cited

UNITED STATES PATENTS

| | | | |
|---|---|---|---|
| 3,285,157 | 11/1966 | Smith | 34—10 X |
| 2,611,683 | 9/1952 | Knibbs | 23—288.35 |
| 2,836,902 | 6/1958 | North | 34—57 |
| 2,934,411 | 4/1960 | Purse | 34—57 |
| 2,990,260 | 6/1961 | Mungen | 23—288.35 |
| 3,053,642 | 9/1962 | Huntley et al. | 34—57 |
| 3,215,508 | 11/1965 | Piester | 34—57 |

FREDERICK L. MATTESON, JR., *Primary Examiner.*

J. J. CAMBY, *Examiner.*